Figure 1:
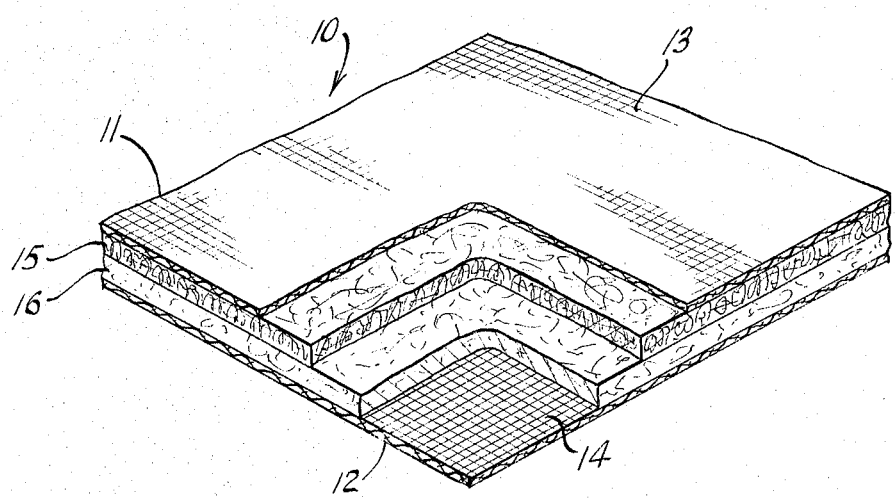

Oct. 4, 1966 F. K. MESEK ET AL 3,276,597

FILTER MEDIA

Filed Nov. 6, 1963

INVENTORS:
FREDERICK K. MESEK
ERLE V. PAINTER
BY Harold L. Warner
ATTORNEY

United States Patent Office 3,276,597
Patented Oct. 4, 1966

3,276,597
FILTER MEDIA
Frederick K. Mesek, Downers Grove, and Erle V. Painter, La Grange, Ill., assignors to Johnson & Johnson, a corporation of New Jersey
Filed Nov. 6, 1963, Ser. No. 321,934
6 Claims. (Cl. 210—489)

The present invention relates to new and improved filter media for separating finely divided solids and semi-solids from fluids. More particularly, the present invention is concerned with layered filter media of the type wherein several layers of different pore size are employed, the layered filter media being particularly adapted for the filtering of highly viscous solutions of high polymeric materials preparatory to the conversion of such solutions into filaments, films and the like. Some examples of such high polymeric materials are cellophane, viscous rayon, cuprammonium rayon, cellulose esters such as cellulose acetate and triacetate, and acrylic fibers such for example as those sold under the trade names "Acrilan" and "Creslan" etc.

Although the basic concept of the invention is applicable to the preparation of filter media for any highly viscous polymeric materials of the types generally used in making synthetic fibers, films and the like, the invention is particularly applicable to filters for the filtration of viscose solutions and will, accordingly, be described with particular reference to the filtration of highly viscous solutions such as used for the spinning of rayon filaments. The invention, however, is not limited to filters for the filtration of viscose solutions and the reference thereto is primarily for the purpose of illustrating the invention and is not to be construed as limitive of the broader aspects thereof.

In the spinning of filaments such as rayon filaments, it is essential that the spinning solution be substantially free of solid and semi-solid particles and that it have a uniform consistency. Otherwise, the orifices in the spinnerette through which the solution is passed quickly become partially or completely blocked thus disrupting operations or, at best, providing barely operating conditions which yield defective, non-uniform and unsatisfactory filaments. Additionally, even if such solid and semi-solid particles manage to get through the spinnerette, their presence in the final product exerts an undesirable, weakening effect. This weakening caused by the presence of foreign bodies is primarily a problem for low denier filaments, particularly for those having a diameter of from about 3 microns to about 75 microns and for thin cellophane sheets and films such as those having a thickness range of from about .0005 inch to about .01 inch.

It has heretofore been proposed, in the filtration of such solutions, to use zoned filters, the filter being made up of several layers of varying pore size in order to trap particles of varying size that may be contained in the solution to be filtered. For the filtration of viscose rayon solutions it has, accordingly, been the custom to use a filter having an initial filter zone with a maximum pore size within the range of about 175 to about 300 microns to filter out larger particles and skins, followed by one or more filter zones of substantially smaller pore size to take out the smaller particles; the maximum pore size generally being in the range of about 55 to 160 microns. The skins referred to are coagulated film flakes that tend to form in the processing equipment and must be removed along with any other particles present. These filters, which have heretofore been made of cotton, may contain several layers of graded pore size having different pore sizes per layer depending upon the particular viscose solution being used. The pore sizes, however, generally fall within the ranges indicated above.

Filters using filter layers of varying pore size of the type described have proved to be quite satisfactory in the removal of undesirable particles from the viscose solution, however, there is still much to be desired as far as improving the life of the filter, that is the time required for the filter to become so plugged that it is no longer satisfactorily operable.

An examination of these prior art filters which have been in use, and have been used to the point where they failed to satisfactorily pass the viscose solution, has shown that the primary point of breakdown of the filter appears to be in the initial filter zone. The initial filter zone becomes so plugged that it substantially restricts the flow of the viscose solution on through to the remainder of the filter. The filter failure is not an abrupt stoppage of the flow of the viscose solution through the filter, but a gradual build-up with increasing pressures required to force the viscose solution through the filter to the point where the resistance of the filter is such that it is no longer satisfactory.

An object of the present invention is to prepare filter media for the filtration of highly viscous solutions which has a substantially greater life. A further object of the present invention is to prepare filters of improved life without jeopardizing the particle removal efficiency of the filter. A further object is to prepare filters, for the filtering of viscose solutions and the like, of layered filter media of varying pore size in which the larger pore size layer adapted to remove the larger particles and skins from the solution will not fill up and block flow through the remainder of the filter. A still further object is to prepare a filter media having at least one initial zone of relatively large pore size formed of relatively stiff large diameter fibers which resist compression during filtration followed by a filter zone of substantially smaller pore size formed of relatively small diameter flexible fibers which tend to become limp and compacted during filtration and thus reduce the pore size still further. Other objects and advantages of the present invention will become apparent from the specification and drawings in which are disclosed certain specific embodiments which are used for the purpose of illustration only the invention not being limited thereto.

It has now been discovered that the above objects can be obtained and the above difficulties obviated if there is placed on the inlet side of the filter media prior to the filter zone of relatively small pore size, a filter layer formed of springy relatively rigid or stiff fibers which do not lose their springy characteristics when thoroughly and continuously wetted by immersion in the viscose solution being filtered during the life of the filter media. Also it is found that the best results are obtained when the pore size of this layer of springy fibers is increased to substantially over the maximum pore size range of about 175 to about 300 microns heretofore used in the initial filter zone. This is indeed surprising when it is considered that such an increase in pore size would normally be expected to allow substantially more of such a larger particle size material and skins to pass on through to the following filter layer or layers of substantially smaller pore size with the result that these layers then in turn would become blocked more rapidly with no appreciable increase in the over-all life of the filter media.

Figure 2:
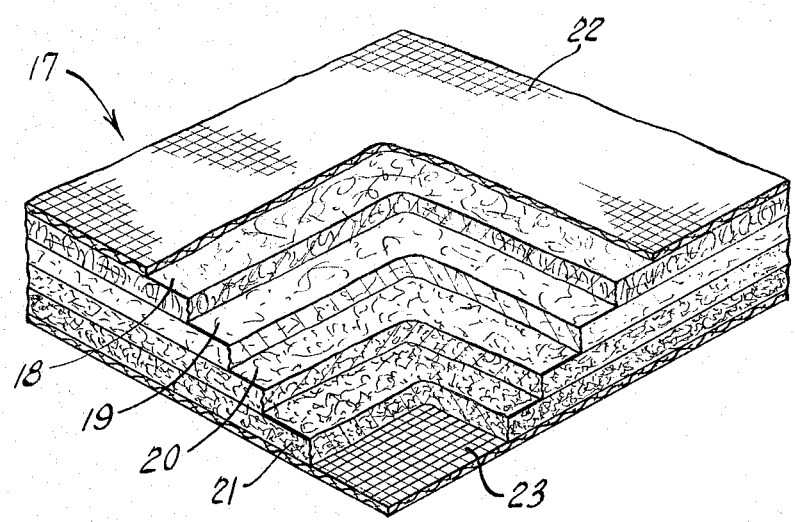

In order to more clearly describe the present invention, reference is made to the drawings in which:

FIG. 1 is an illustration of a filter media with portions broken away to show the different filter elements; and FIG. 2 is a somewhat different construction of a filter media made in accordance with the present invention, but having a multiplicity of layers of relatively fine pore size.

Referring to FIGURE 1, the filter media 10 contains on its inlet side 11 and on its outlet side 12 outer protective coverings, designated respectively as 13 and 14. Outer protective covering 13 is formed of open mesh gauze of about 14 x 10 thread count. The outer protective covering 14 may be formed of similar gauze or of a somewhat more closely woven fabric material. The coverings 13 and 14 serve primarily to protect the filter media and give the same added strength in handling. On the inlet side, next to the protective gauze covering 13 is an initial filter zone or filter layer 15 of relatively large pore size formed of springy, relatively rigid fibers of the type hereinafter more fully described. This is followed by a filter zone 16 of substantially smaller pore size.

The fibers forming filter layer 16 may have any suitable composition and may be of the same materials from which the fibers of filter layer 15 are formed. Thus filter zone or layer 16 may be formed of fine modacrylic fibers or the like. In the preferred practice of the present invention, however, the filter layer or layers of substantially smaller pore size are formed of a fiber that tends to soften or become limp in the solution being filtered with the result that these fibers are further compacted during the filtering operation with still further reduction of pore size. Cotton fibers have this characteristic of softening, or becoming limp when immersed in viscose solutions for extended periods of time and are accordingly used in the preferred practice of the present invention in the formation of the filter zone or layer 16 of substantially smaller pore size.

The filter layer 15, which is on the inlet side of the filter media 10, is formed from a relatively resilient fiber having a denier generally substantially larger than that of cotton to give it substantial rigidity and should be made of a material that will not become limp when wetted by the solution being filtered so that it will retain its resilient characteristics. Such a material, for example, for use in viscose solutions being modacrylic fibers. Although viscose rayon fibers would not be satisfactory for filtering viscose solutions, since the viscose rayon itself would tend to dissolve in the viscose solution over an extended period of time, viscose rayon fibers could for example be used as the fibers in filter layer 15 for the filtration of cellulose acetate solutions in the formation of cellulose acetate fibers and the like. The important thing is to have the fibers of filter layer 15 be of sufficient denier to give them the mechanical rigidity necessary to retain their resiliency and at the same time to have them formed of a material that is not effected by the solution to be filtered so that they will not become limp and the filter zone lose its resiliently during filtration. The denier of the fibers of layer 15 should preferably be at least 5 and is generally within the range of about 5 to 24; the preferred denier being in the upper half of this range. Higher denier fibers may be used. However, with fiber deniers of much above 24 substantial difficulty is encountered in handling the same in most web forming machinery.

As previously indicated, it is important, from the standpoint of improved filter life, that the incoming filter zone 15 maintain its open construction and resilient nature and that the fibers forming the same do not become collapsed under the high operating pressures encountered during the filtering operation. It is found that the rigidity of the fiber structure and its resistance to collapse can be even further improved particularly for the smaller denier fibers by bonding fibers in the filter zone at points of crossing with a suitable binder resistant to the solution to be filtered. This may be done by spraying the fiber web with a solution of the binder or by immersing the web in such a solution containing for example 1 to 10 percent by weight concentration of the binder resin and then removing the excess fluid and drying. A suitable resin binder for example for bonding crossing fibers where the filter media is to be used for filtering viscose solutions is polyvinyl alcohol.

Although from a standpoint of cost at the present time, the modacrylic fibers sold under the trade name of Dynel are highly satisfactory for practicing the present invention in making the springy fiber layer 15, the invention is not limited thereto, and other fibers which are also suitable for forming such a layer in a filter for viscose solutions include, for example, olefin fibers, polyester fibers, nylon fibers and other similar fibers which have the required rigidity and resistance to softening by viscose solutions.

Heretofore, as previously indicated, the initial, or incoming fibrous filter layer of filter media for viscose filtration preferably had a maximum pore size in the order of about 175 to about 300 microns as for example described in Thomas Patent No. 3,003,643. However, it has been found that in practicing the present invention, the best results are obtained, as heretofore indicated, if the maximum pore size of the initial springy fiber filter layer 15 is substantially larger than the maximum of 300 microns heretofore employed. It is generally preferred to have a maximum pore size in the springy fiber layer 15 of about 500 to 1000 microns where the weight of fibers is not substantially over 1 oz./sq. yd. However, where the weight of fibers is increased to much above 1 oz./sq. yd. the maximum pore size of the resilient web would be somewhat lower. However, the maximum pore size should generally not be much below about 250 microns even when the weight of the incoming fiber layer 15 is as much as 3 oz./sq. yd.

Pore, as the term is used herein, is a fluid conducting passage passing completely through the filter medium. Maximum pore size is the largest cross sectional passage as determined by the smallest cross sectional area of such passage as it is the smallest cross sectional area of any passage that determines the actual fluid flow therethrough. The pore diameter measurements referred to herein and called maximum pore size are determined under a compacting pressure of 30 p.s.i. by the standard tests set forth in the Journal of the Textile Institute, May 1954 on pages T371 through T389.

As previously indicated, filter layer or zone 16 is preferably formed of cotton fibers and has a maximum pore size in the range of about 55 to 160 microns as measured in the manner hereinafter indicated. It should be noted, however, that cotton fibers tend to soften in the viscose solution and are compressed under the high pressures encountered during filtration. As a result, the actual pore size during filter operation is somewhat less than that indicated.

The filter media 17 of FIGURE 2 differs from that disclosed in FIGURE 1 primarily in that filter layer 18 of resilient fibers, resistant to filtrate, is followed by a plurality of filter layers or zones 19, 20 and 21 formed of cotton fibers each zone having progressively decreasing pore sizes.

In a similar manner, as with filter media 10, filter media 17 of FIGURE 2 contains an outer covering 22 on its inlet side covering filter layer 18 and an outer covering 23 on its outlet side covering filter layer 21, the outer coverings being essentially of the same materials as used for the coverings 13 and 14 of FIGURE 1. Also filter layer 18 of filter media 17 of FIGURE 2 is essentially the same as filter layer 15 of filter media 10 of FIGURE 1. The remaining filter layers 19, 20 and 21 are formed of cellulose fibers.

Following filter layer 18 is a combination of several layers having a fiber length, as in filter layer 18, of from about 1 millimeter to about 5 centimeters, the fibers of the following filter layers 19, 20 and 21 being formed of cotton or similar cellulosic material. The properties and characteristics of these following individual layers is so adjusted that each in turn separates out successively smaller particles these layers being similar to the successive layers as for example described in Thomas Patent No. 3,003,643. Thus, the second filtering layer 19 of the combination comprises fibers having an average fineness equivalent of a weight of from about 5.5 to about 7.5 micrograms per linear inch for a material having a density of cellulose (Micronaire Method). The maximum pore diameter of this second layer ranges from about 71 to about 160 microns and preferably, about 80 to about 140 microns. The weight of this second filtering layer 19 ranges from about 875 to about 3500 grains per square yard and preferably from about 1300 to about 2500 grains per square yard. This combination of maximum pore diameter, weight and fiber fineness values cooperates to enable the second filtering layer to carry out its major function of separating out the large particles which have not been separated out by the incoming fibrous layer 18, while permitting the smaller particles to pass therethrough.

The third filtering layer 20 is made of finer fibers than the second filtering layer 19 and has an average fiber fineness of from about 3 to about 5.4 micrograms per linear inch for a material having the density of cellulose and preferably from about 3.4 to about 5.0 micrograms per linear inch. The third filtering layer 20 has a lower maximum pore diameter than the second filtering layer and is in the range of from about 48 to about 95 microns, and preferably from about 52 to about 75 microns. The weight of the third filtering layer is in the range of from about 875 to about 3500 grains per square yard and preferably from about 1300 to about 2500 grains per square yard.

The fourth filtering layer 21 contains fibers which form a layer which is denser than the preceding two layers and has a density in the range of from about 230 to about 290 grains per cubic inch. This fourth layer has a lower maximum pore diameter than the preceding layers and is in the range of from about 45 to about 60 microns and preferably from about 50 to about 58 microns. This layer may advantageously be treated with a wet strength chemical, such as a melamineformaldehyde resin or a urea-formaldehyde resin to provide any desired wet strength.

The fourth layer filters out the extremely small particles which are not separated out by the preceding filtering layers. This separation is the finest of all the filtrations accomplished by the filter media 17 of FIGURE 2.

One typical material suitable for use as the fourth filtering layer 21 of FIGURE 2 is a layer of wet-formed cotton linter pulp having a weight of from about 4000 to about 5300 grains per square yard. This weight and density cooperate in the wet forming process to yield the desired maximum pore diameter and filtering characteristics.

As previously indicated, an outgoing cover 23 of gauze or the like is provided. The purpose of the outgoing cover is to provide strength to the package dressing and to prevent any of the smaller fibers of the preceding layers which may break loose from being carried into the filtrate.

The invention is further illustrated in greater detail by the following specific example. It should be understood, however, that though this example describes the use of a particular fiber in the initial resilient fiber filter layer, it is given primarily for the purpose of illustration and the invention in its broader aspects is not to be construed as limited thereto.

*Example*

A filter media is prepared according to the following specifications: The incoming layer (600 grains per square yard) is formed of 14 x 10 gauze upon which is deposited and bonded thereto approximately 440 grains per square yard of cotton fibers having a fiber fineness of about 7.0 micrograms per linear inch. A second filtering layer is prepared comprising the fibers laid to a weight of 1750 grains per square yard, the fibers being cotton having a fineness of approximately 5.5 micrograms per linear inch. A third filter layer is formed of cotton at a fiber weight of 475 grains per square yard, the fibers having a fineness of about 3.5 micrograms per linear inch. There is then added a layer of outgoing gauze to give the assembly strength.

A second filter media is prepared identical to the first filter media with the exception that the first layer is formed of 6 denier Dynel fiber laid at a weight of 1.5 ounces per square yard. This is in place of the incoming layer of the first filter media formed of gauze having bonded thereto cotton fibers. The layer of Dynel fibers is covered with 14 x 10 gauze. The two filter media are tested with identical viscose solutions. The first filter media has a filter life of 47 hours, in actual operation, while the second filter media with the resilient filter layer of Dynel fibers has a filter life of 89 hours under identical operating conditions this being approximately twice the operational life of the first filter media.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described our invention, we claim:

1. A fiber filter media for use in the filtration of solutions of high polymeric materials preparatory to the conversion of said solutions into filaments, film and the like comprising an incoming filter zone of relatively large pore size, the fibers forming said filter zone of relatively large pore size consisting essentially of relatively stiff, resilient, synthetic fibers of denier within the range of about 5 to 24 which synthetic fibers retain their rigidity during filtration and are inert to the filtration solution, said incoming filter zone being followed by a filter zone of substantially smaller pore size formed of highly flexible readily compressible fibers having a denier substantially smaller than the denier of the fibers of said incoming filter zone, the pore size of said incoming filter zone being within the range of 500 through 1000 microns where the weight of fibers forming said incoming filter zone is not substantially over one ounce per square yard.

2. A filter media of claim 1 in which the fibers of said incoming filter zone are of the group consisting of modacrylic fibers, polyester fibers and nylon fibers.

3. A filter media of claim 1 in which the fibers of said filter zone of substantially smaller pore size are cotton fibers.

4. A filter media of claim 1 in which the rigidity of the fibers of said incoming filter zone is increased by bonding adjacent fibers at numerous points of fiber intersection throughout said filter zone.

5. A filter media of claim 4 in which the fibers of said incoming filter zone are of the group consisting of modacrylic fibers, polyester fibers and nylon fibers and the fibers of said zone of substantially smaller pore size are of cellulosic fibers, including cotton, and having substantially the same denier as cotton fibers.

6. A filter media of claim 5 in which the filter zone of substantially smaller pore size is formed of a plurality of filter layers of progressively decreasing pore size moving from the inlet side of the filter towards the outlet side thereof.

References Cited by the Examiner

UNITED STATES PATENTS

| | | | |
|---|---|---|---|
| 2,288,426 | 6/1942 | Stack | 210—489 |
| 2,834,730 | 5/1958 | Painter et al. | 210—491 X |
| 3,003,643 | 10/1961 | Thomas | 210—508 X |

REUBEN FRIEDMAN, *Primary Examiner.*

SAM ZAHARNA, *Examiner.*